US008446523B2

United States Patent
Wang et al.

(10) Patent No.: US 8,446,523 B2
(45) Date of Patent: May 21, 2013

(54) IMAGE PROCESSING METHOD AND CIRCUIT

(75) Inventors: Su-Chun Wang, Hsinchu Hsien (TW); Chung-Yi Chen, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 656 days.

(21) Appl. No.: 12/631,273

(22) Filed: Dec. 4, 2009

(65) Prior Publication Data

US 2010/0238348 A1 Sep. 23, 2010

(30) Foreign Application Priority Data

Mar. 18, 2009 (TW) .................. 98108834 A (51) Int. Cl.
 H04N 7/01 (2006.01)
 H04N 11/20 (2006.01)
 H04N 5/14 (2006.01)
 H04N 9/64 (2006.01)
(52) U.S. Cl.
 USPC ............ 348/441; 348/458; 348/447; 348/700
(58) Field of Classification Search
 USPC .................. 348/441, 410–416, 459
 See application file for complete search history.

(56) References Cited

U.S. PATENT DOCUMENTS

| 5,828,786 | A | * | 10/1998 | Rao et al. | 382/236 |
|---|---|---|---|---|---|
| 5,929,919 | A | * | 7/1999 | De Haan et al. | 348/452 |
| 6,411,341 | B1 | * | 6/2002 | De Haan et al. | 348/714 |
| 6,542,196 | B1 | * | 4/2003 | Watkins | 348/448 |
| 6,567,469 | B1 | * | 5/2003 | Rackett | 375/240.16 |
| 7,295,245 | B2 | * | 11/2007 | Ha | 348/452 |
| 8,045,817 | B2 | | 10/2011 | Jun | 382/254 |
| 8,054,381 | B2 | * | 11/2011 | Chang | 348/459 |
| 8,184,200 | B1 | * | 5/2012 | Biswas et al. | 348/459 |
| 2004/0066466 | A1 | * | 4/2004 | MacInnis et al. | 348/451 |
| 2004/0239803 | A1 | * | 12/2004 | Selby et al. | 348/459 |
| 2005/0018076 | A1 | * | 1/2005 | Riemens et al. | 348/446 |
| 2007/0291843 | A1 | * | 12/2007 | Chappalli et al. | 375/240.16 |
| 2008/0062310 | A1 | * | 3/2008 | Sato | 348/452 |
| 2008/0100744 | A1 | * | 5/2008 | Lee | 348/452 |
| 2008/0252721 | A1 | * | 10/2008 | Suzuki | 348/97 |
| 2008/0259207 | A1 | * | 10/2008 | De Haan et al. | 348/452 |
| 2008/0304568 | A1 | * | 12/2008 | Chang | 375/240.16 |

* cited by examiner

Primary Examiner — Brian Yenke
(74) Attorney, Agent, or Firm — WPAT, PC; Justin King (57) ABSTRACT

An image processing circuit includes a de-interlace circuit, a motion interpolation circuit and a frame processing circuit. The image processing circuit receives a first field and a second field respectively from two successive film frames. A plurality of block motion vectors are calculated according to the first field and the second field. A plurality of interpolated frames are calculated according to the first field, the second field and the plurality of motion vectors.

14 Claims, 10 Drawing Sheets

IMAGE PROCESSING METHOD AND CIRCUIT

CROSS REFERENCE TO RELATED PATENT APPLICATION

This patent application is based on Taiwan, R.O.C. patent application No. 98108834 filed on Mar. 18, 2009.

FIELD OF THE INVENTION

The present invention relates to an image processing method applied to a television (TV) and a circuit thereof, and more particularly, to a motion-compensating image processing method for doubling frame rate of output of a film mode and a circuit thereof.

BACKGROUND OF THE INVENTION

In a conventional data transmission of TV images, taking a video mode for example, the TV images are transmitted by interlacing fields. That is, each of the frames are divided into an odd field and an even filed, and the odd field only comprises pixels on odd lines of a frame, and the even field only comprises pixels on even lines of the frame. During the transmission, the odd field and the even field are alternately transmitted for the reason that data transmission amount can be reduced by a half. Therefore, an image data received at a receiving end is either the odd field or the even field rather than a complete frame, and the received image data needs to be de-interlaced to restore the completed frame to be displayed on an image display.

Figure 1A:
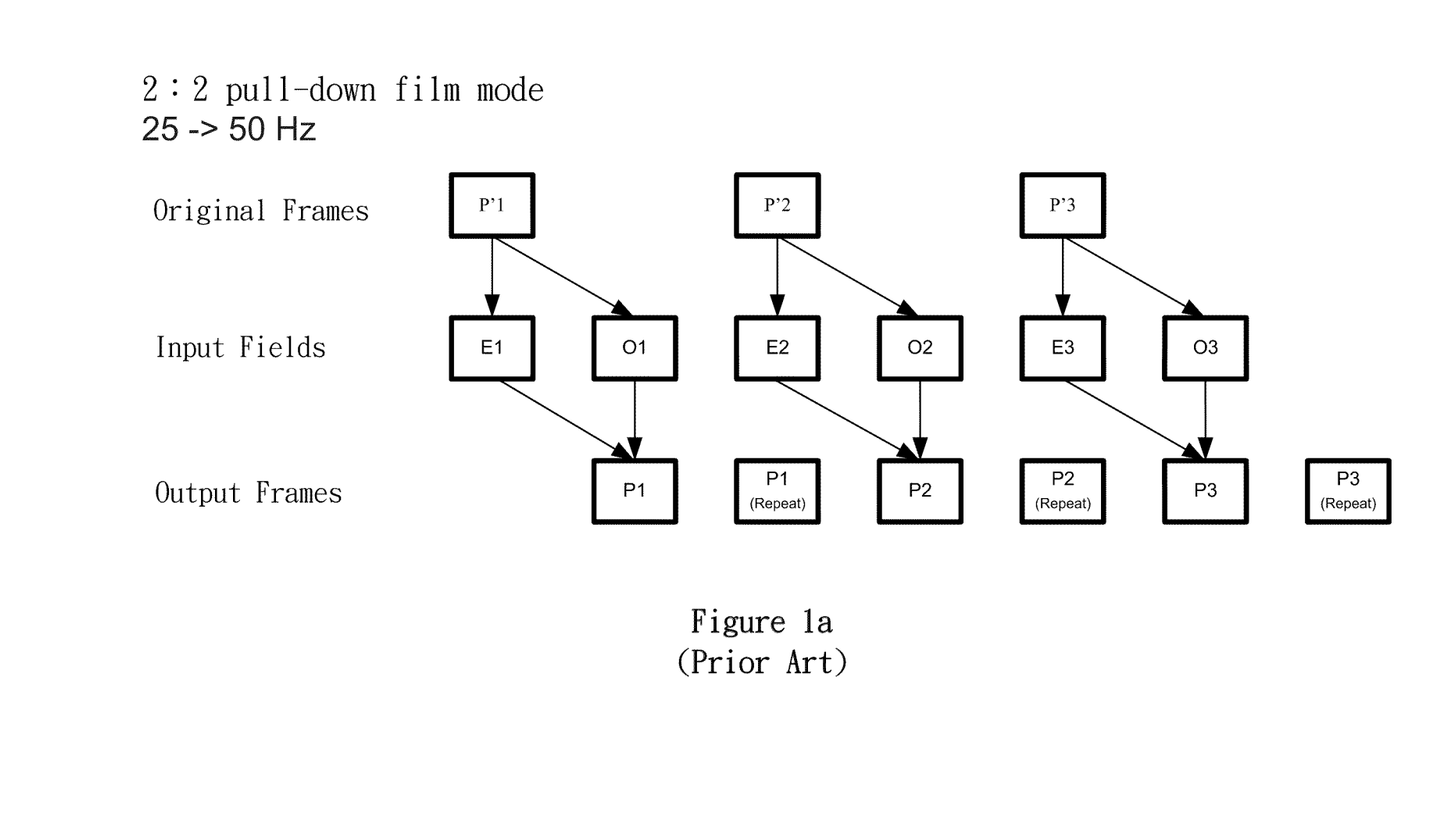
FIG. 1a is a schematic diagram of an image processing of a conventional 2:2 pull-down film mode

Under a film mode, 24/25 frames are outputted per second, which is different from a video frame of outputting 50/60 frames per second. FIG. 1a is a schematic diagram of a de-interlace processing of a conventional 2:2 pull-down film mode. At a TV transmitting end such as a TV station, via an interlacing, a first even field E1 and a first odd field O1 are generated from a first original frame P'1, and a second even field E2 and a second odd field O2 are generated from a second original frame P'2. The first even field E1, the first odd field O1, the second even field E2 and the second odd field E2 are transmitted in sequence to a TV receiving end such as a TV set. When the TV receiving end performs a de-interlacing, a first restored frame P1 is restored from the first even field E1 and the first odd field O1. 25 output frames per second of the film mode are converted to 50 output frames per second of the TV mode. Therefore, a first restored frame P1 is repeated again at a next output period. Accordingly, a second restored frame P2 is restored from the second even field E2 and the second odd field O2, and the second restored frame P2 is repeated at a next output period.

Figure 1B:
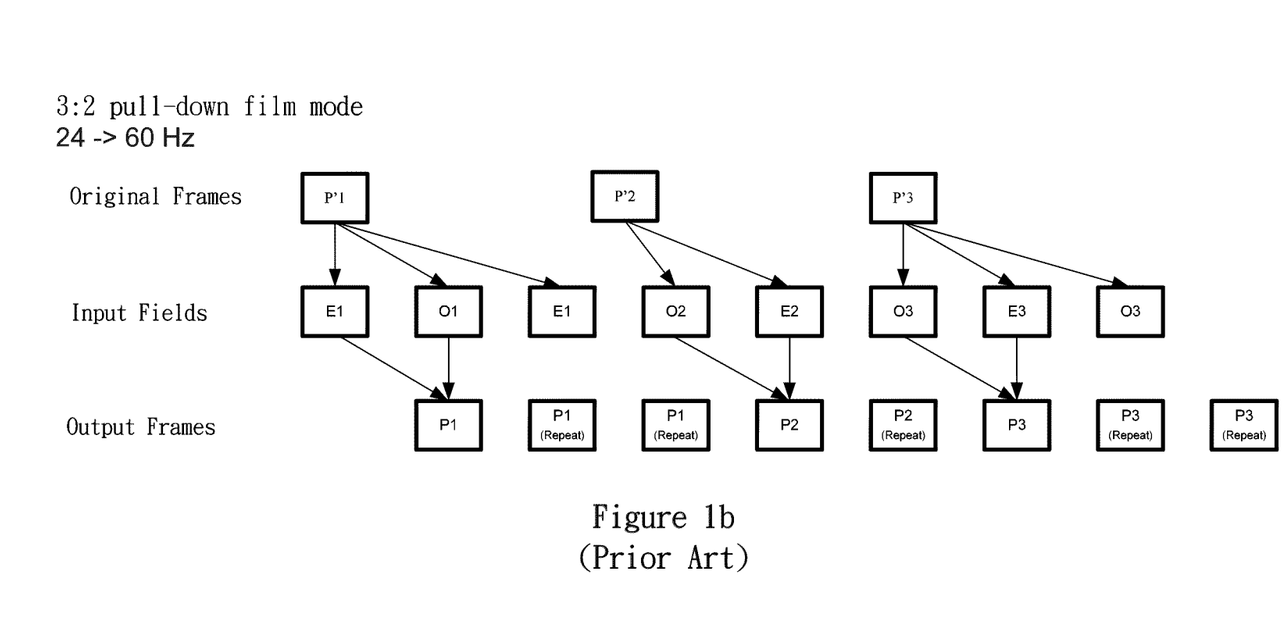
FIG. 1b is a schematic diagram of an image processing of a conventional 3:2 pull-down film mode.

FIG. 1b is a schematic diagram of a de-interlace processing of a conventional 3:2 pull-down film mode. In this mode, 24 output frames per second of the film mode are converted to 60 output frames per second of the TV mode. A TV transmitting end performs an interlacing such that a first original frame P'1 forms into three fields E1, O1 and E1 in sequence, a second original frame P'2 forms into two fields O2 and E2 in sequence, and a third original frame P'3 forms into three fields O3, E3 and O3. The foregoing fields are then transmitted to a TV receiving end in sequence. When the TV receiving end performs a de-interlacing, a first restored frame P1 is restored from the fields E1 and O1. The 24 output frames per second of the film mode are converted to 60 output frames per second of the TV mode. Therefore, the first restored frame P1 is repeated twice to be respectively outputted at next two output times. A second restored frame P2 is restored from the fields O2 and E2, and is then repeated at a successive output time. A de-interlace processing of a third restored frame is the same as that of the first restored frame, a de-interlace processing of a fourth restored frame is the same as that of the first restored frame, and so on.

However, the foregoing method can not solve an undesirable affect from an object motion between successive frames. Take the 2:2 pull-down mode in FIG. 1a, and TV output images arranged as frame P1, frame P1, frame P2, frame P2 and so on for example. With respect to an output sequence, the first three frames P1, P1 and P2 have a same output interval between one another; however, when being recorded, the frames P1, P1 and P2 are not generated at a same interval. Therefore, when a motion object exists in a TV image, and the first three frames P1, P1 and P2 are displayed, jittering may occur when the second output frame is directly copied and outputted. The second output frame is preferably between the first output frame P1 and the third output frame P2 rather than being directly copied and outputted.

In recent years, liquid crystal display (LCD) technique develops very quickly, and a current LCD panel may output 100/200 frames per second. When a film mode is applied to the LCD capable of outputting 100/200 frames per second, 4 or 5 frames may be successively repeated so that obvious jitter (unsmooth visual effect) occurs. Therefore, a motion-compensating image processing circuit for frame rate conversion and a method thereof are provided according to the present invention, so as to overcome the foregoing disadvantage.

SUMMARY OF THE INVENTION

Therefore, one object of the present invention is to provide a motion-compensating image processing circuit for frame rate conversion and a method thereof, so as to solve a problem that obvious jitter occurs in a mode of outputting 100/120 frames per second.

An image processing method for processing a plurality of successive fields of a film mode is provided according to an embodiment of the present invention. The method comprises receiving a first field and a second field respectively from two successive film frames, calculating a motion vector set according to the first field and the second field, and generating at least one interpolation frame according to the first field, the second field and the motion vector set.

An image processing circuit for processing a plurality of successive fields in a film mode is further provided according to another embodiment of the present invention. The image processing circuit, for processing a plurality of successive fields comprising a first field and a second field, wherein the first field and the second field respectively are generated from two successive film frames. The image processing circuit comprises a motion estimating circuit, for performing block matching on the first field and the second field to generate a motion vector set and a motion compensation circuit, for performing motion interpolation to generate at least one interpolation frame according to the first field, the second field and the motion vector set.

An image processing method for receiving successive frames in a film mode is provided according to another embodiment of the present invention. The method comprises receiving a first frame and a second frame respectively from two successive film frames, calculating a plurality of block motion vectors according to the first and second frames, and generating at least one interpolation frame according to the first frame, the second frame and the plurality of motion vectors.

An image processing method for processing a plurality of first fields and a plurality of second fields in a film mode is provided according to an embodiment of the present invention. The method comprises generating a first restored frame and a second restored frame respectively according to the plurality of first fields and the plurality of second fields, generating at least one block motion vector according to one of the first fields and one of the second fields, and generating at least one interpolation frame according to the first field, the second field and the plurality of motion vectors. In a time sequence, the interpolation frame is interpolated between the first restored frame and the second restored frame.

An image processing circuit for processing a plurality of first fields and a plurality of second fields in a film mode is yet provided according to an embodiment of the present invention. The image processing circuit comprises a de-interlace circuit and a motion interpolation circuit. The de-interlace circuit generates a first restored frame and a second restored frame respectively according to the plurality of first fields and the plurality of second fields. The motion interpolation circuit generates at least one block motion vector according to one of the plurality of first fields and one of the plurality of second fields, and generates at least one interpolation frame according to the first field, the second field and the plurality of motion vectors. In a time sequence, the interpolation frame is interpolated between the first restored frame and the second restored frame.

One advantage of the present invention is to provide a motion-compensating image processing circuit for frame rate conversion and a method thereof. An image interpolation is performed according to a proportion of output times, so as to solve a problem that obvious jitter occurs in a mode of outputting 100/120 frames per second.

BRIEF DESCRIPTION OF THE DRAWINGS

Following description and figures are disclosed to gain a better understanding of the advantages of the present invention.

DETAILED DESCRIPTION OF THE PREFERRED EMBODIMENT

Figure 2:
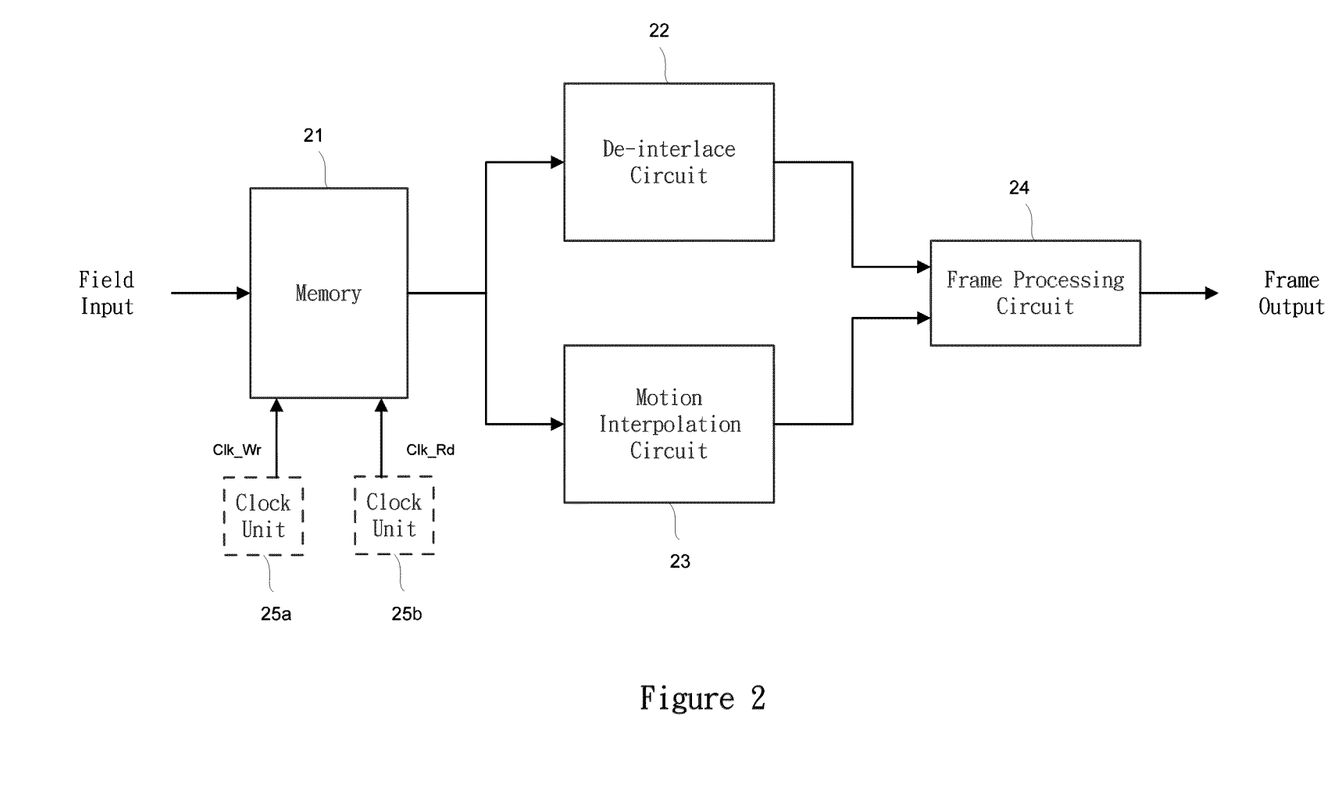
FIG. 2 is a block diagram of a circuit in accordance with a detailed embodiment of the present invention.
Figure 3A:
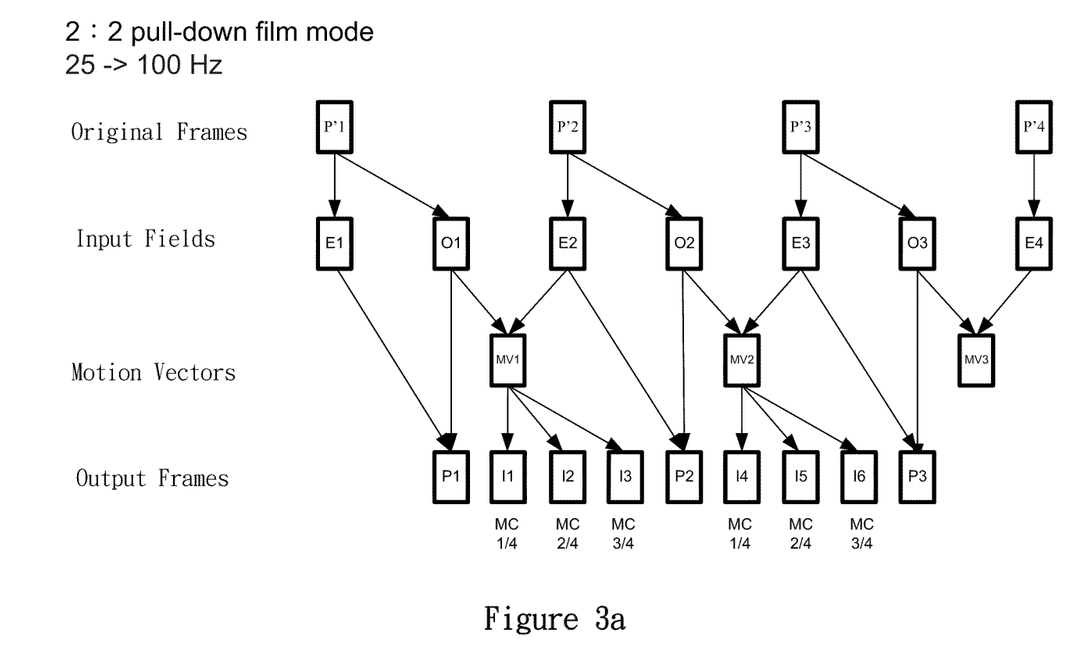
FIG. 3a is a schematic diagram of an image processing of a 2:2 pull-down film mode.
Figure 3B:
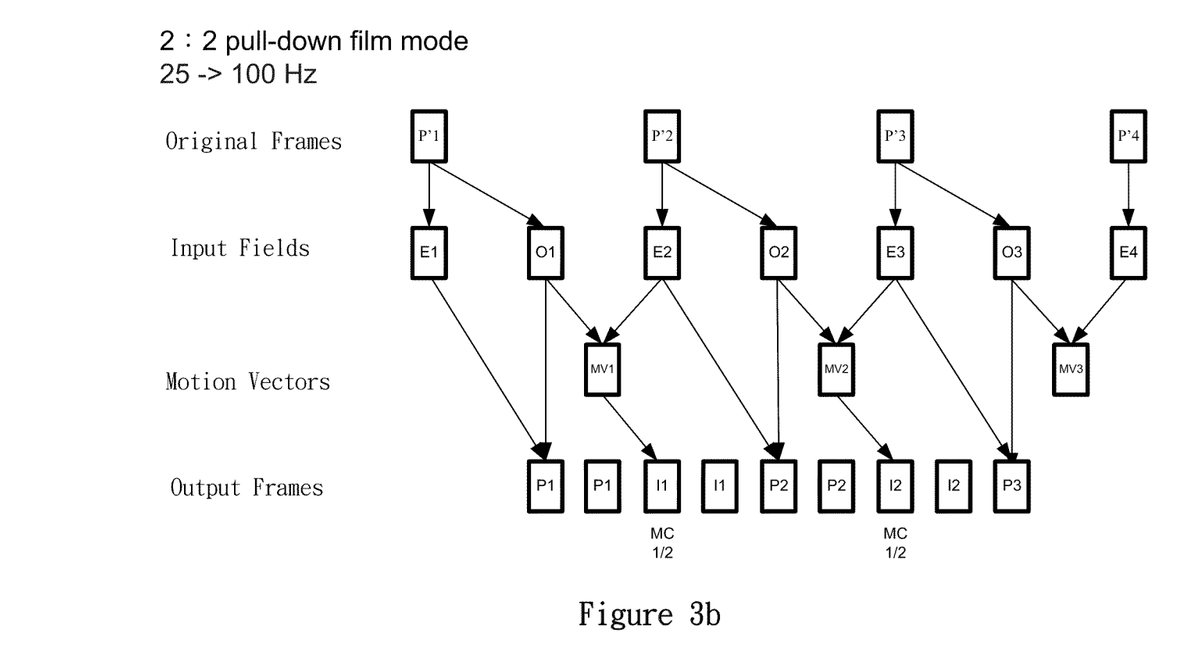
FIG. 3b is a schematic diagram of an image processing of another 2:2 pull-down film mode.

A motion-compensating image processing circuit for frame rate conversion is provided according to the present invention. The image processing circuit receives input data of 50/60 film fields per second and generates output data of 100/120 frames per second. Refer to FIG. 2 showing a block diagram of an image processing circuit in accordance with a preferred embodiment of the present invention. The image processing circuit comprises a memory 21, a de-interlace circuit 22, a motion interpolation circuit 23 and a frame processing circuit 24. The memory 21 may be a field or frame buffer integrated to the image processing circuit. On the contrary, when the memory 21 is not contained in the foregoing image processing circuit, a dynamic random access memory (DRAM) coupled to the image processing circuit is used for storing field information. That is, the image processing circuit and the memory may be in different chips. The memory 21 stores fields received by a receiving unit (not shown). The de-interlace circuit 22 coupled to the memory 21 is used for calculating and generating a restored frame according to the fields stored in the memory 21. The motion interpolation circuit 23, coupled to the memory 21, is used for calculating and generating at least one interpolation frame according to the fields stored in the memory 21. The frame processing circuit 24, coupled to the de-interlace circuit 22 and the motion interpolation circuit 23, is used for generating an output frame according to the restored frame generated by the de-interlace circuit 22 and the at least one interpolation frame generated by the motion interpolation circuit 23. More particularly, the frame processing circuit 24 is a frame selecting unit for selecting one of the restored frames generated by the de-interlace circuit 22 and the at least one interpolation frame generated by the motion interpolation circuit 23, and the frame as selected is regarded as an output frame. The frame processing circuit 24 can be a frame blending unit for performing blending to generate the output frame according to the restored frame generated by the de-interlace circuit 22 and the at least one interpolation frame generated by the motion interpolation circuit 23. Refer to FIG. 3a and FIG. 3b for a detailed description on the operation method below.

FIG. 3a is a schematic diagram of an image process of a 2:2 pull-down film mode in accordance with an embodiment of the present invention. In this mode, 25 output frames per second of the film mode are converted to 100 output frames per second of the TV mode. At a TV transmitting end such as a TV station, a first even field E1 and a first odd field O1 are generated from a first original frame P'1 via an interlace processing, and a second even field E2 and a second odd field O2 are generated from a second original frame P'2 via an interlace processing. The generated fields are transmitted in sequence to a TV receiving end, e.g., a TV, comprising an image processing device illustrated in FIG. 2. The input fields E1, O2, E2, O2, E3, O3, E4, . . . are stored in sequence into the memory 21. The de-interlace circuit 22 restores a first restored frame P1 from the first even field E1 and the first odd field O1, a second restored frame P2 from the second even field E2 and the second odd field O2 in sequence, and a third restored frame P3 from the third even field E3 and the third odd field O3. According to the present invention, the motion interpolation circuit 23 generates a first motion vector set MV1 according to the first odd field O1 and the second even field E2. The first motion vector set MV1 comprises at least one block motion vector respectively corresponding to various blocks of the first odd field O1 and the second even field E2. According to an embodiment illustrated in FIG. 3a, the first motion vector set MV1 is a motion direction and distance between two corresponding pixels of the first odd fields O1 and the second even field E2; however, it shall not be construed as limiting. The first motion vector set MV1 is estimated by searching for the most similar blocks from the blocks of the first odd field O1 and the second even field E2, and the search range may include an entire field or only a specific search block corresponding to a target block in the field. By taking calculation complexity into consideration, the most similar blocks are two blocks having a smallest sum of absolute difference (SAD). The SAD is calculated below:

$$SAD(i, j) = \sum_{k=0}^{N-1}\sum_{l=0}^{N-1} |C(x+k, y+l) - R(x+i+k, y+j+l)|$$

$$-p \le i, j \le p$$

where a motion vector is (m, n) and the SAD is the smallest when i is equal to m and j is equal to n; and
1) N represents the length and width of a block,
2) C(x+k, y+l) represents a point of the target image block in a target image field,
3) R(x+i+k, y+j+l) represents a point of a reference image block in a reference image field, and
4) p represents the search range.

The motion interpolation circuit 23 performs motion interpolation on the first odd field O1 and the second even field E2 according to the first motion vector set MV1. In this embodiment, for example, a 25 Hz film mode is applied to a 100 Hz panel. Therefore, a first motion interpolation frame I1, a second motion interpolation frame I2 and a third motion interpolation frame I3 are generated according to the first motion vector set MV1. More particularly, without changing the direction of the MV1, the first interpolation frame I1 is generated by performing interpolation using a quarter of MV1, three quarters of the first odd field O1 and a quarter of the second even field E2. Any pixel of the first interpolation frame I1 is calculated as:

$$pI1(x,y)=\tfrac{3}{4}*pO1(x1,y1)+\tfrac{1}{4}*pE2(x2,y2),$$

where pO1 and pE2 are obtained by mapping to the MV1.

Next, without changing the direction of the MV1, the second interpolation frame I2 is obtained by performing interpolation using two quarters of MV1, two quarters of the first odd field O1 and two quarters of the second even field E2. Subsequent frames P2, I4, I5, I6 and P3 are similarly generated as the foregoing description. The frame processing circuit 24 outputs the frames P1, I1, I2, I3, P2, I4, I5, I6 and P3 in sequence with a frequency of 100 frames per second. The first odd field O1 and the second even field E2 used by the motion interpolation circuit 23 can be respectively replaced by the first odd field O1 and the second odd field O2, the first even field E1 and the second even field E2, the first frame P1 and the first frame P2, or the first even field E1 and the second odd field O2, so as to generate the first motion vector set MV1 and the interpolation frames I1, I2, and I3.

Refer to FIG. 3b showing a schematic diagram of another image processing of a 2:2 pull-down film mode. The motion interpolation circuit 23 receives the first odd field O1 and the second even field E2, and the processing for generating a first motion vector set MV1 is the same as that illustrated in FIG. 3a. The motion interpolation circuit 23 only generates an interpolation frame I1 according to the first odd field O1, the second even field E2 and the first motion vector set MV1. The interpolation frame I1 is generated as:

$$pI1(x,y)=\tfrac{1}{2}*pO1(x1,y1)+\tfrac{1}{2}*pE2(x2,y2),$$

where pO1 and pE2 are obtained by mapping to MV1.

When outputting frames, the frame processing circuit 24 selects between repeating to output a restored frame (e.g., the first restored frame P1) generated by the de-interlace circuit 22 and an interpolation frame (e.g., the first interpolation frame I1) generated by the motion interpolation circuit 23; that is, the frames P1, P1, I1, I1, P2, P2, I2, I2, P3, I3, I3, and so on are outputted in sequence with a frequency of 100 frames per second. Similarly, the first odd field O1 and the second even field E2 used by the foregoing motion interpolation circuit 23 can be respectively replaced by the first odd field O1 and the second odd field O2, the first frame P1 and the second frame P2, or the first even field E1 and the second odd field O2, so as to generated the first motion vector set MV1 and the interpolation frames I1, I2, and I3.

In addition, FIG. 3a and FIG. 3b show image processing circuits for frame rate conversion, and illustrations on the two frame interpolation situations of the 2:2 pull-down film mode are given as examples; however, the invention is not limited to these two situations. More particularly, in the 2:2 pull-down film mode, a period is from the first frame P1 to the second frame P2, and four frames are outputted during one period. The four frames comprise restored frames and interpolation frames associated with motion vectors. In principle, the interpolation frames are proportional to output times; however, the proportion is not the only limiting condition. According to quality of the interpolation frames, the image processing circuit determines four frames to be outputted during the period, the number of interpolation frames and a ratio between the interpolation frames and the motion vectors. For example, a quality parameter of the interpolation frames is associated with the SAD of the motion vectors. That is, the quality of the interpolation frames becomes unqualified as the SAD of the motion vectors gets too large, which means a display effect also worsens if the interpolation frames are utilized. At this point, the image processing circuit selects and outputs more restored frames and fewer interpolation frames or only outputs restored frames to gain a better display effect. For example, in the embodiment illustrated in FIG. 3b, the frames P1, P1, I1 and I1 are outputted. Interpolation approaches illustrated in FIG. 3a and FIG. 3b can be alternately used. That is, according to the quality of interpolation frames, the image processing circuit according to the present can select frames to be outputted from the restored frames and the interpolation frames.

Figure 3C:
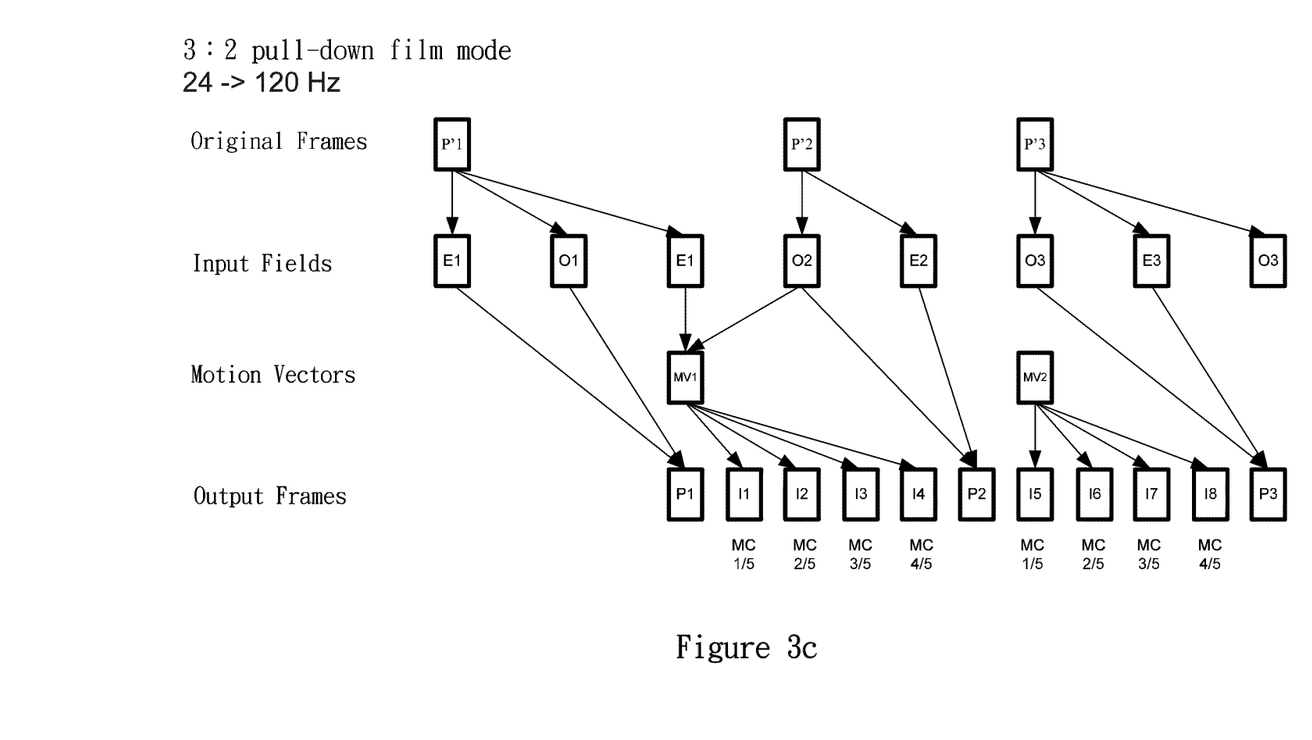
FIG. 3c is a schematic diagram of an image processing of another 3:2 pull-down film mode.

Refer to FIG. 3c showing a schematic diagram of an image processing of a 3:2 pull-down film mode. In this mode, 24 output frames per second of a film mode are converted to 120 output frames per second of a TV mode. A TV transmitting end performs an interlace processing such that a first original frame P'1 forms into three fields E1, O2 and E1 in sequence, a second original frame P'2 forms into two fields O2 and E2 in sequence, and a third original frame P'3 forms into three fields O3, E3 and O3 in sequence. The generated fields are transmitted in sequence to a TV receiving end. The de-interlace circuit 22 of the TV receiving end restores a first restored frame P1 from either one of the fields E1 and the field O1 generated according to the first original frame P'1, and a second restored frame P2 from the field O2 and the field E2. The motion interpolation circuit 23 generates first motion vector set MV1 according to the field E1 generated from the first original frame P'1 and the field O2 generated from the second original frame P'2. The first motion vector set MV1 comprises at least one block motion vector corresponding to various blocks of the first even field E1 and the second odd field O2. The first motion vector set MV1 represents direction and distance between corresponding pixels of the field E1 and the field O2. Each motion vector in the first motion vector set MV1 is estimated by searching for the most similar blocks from the blocks of the first odd field O1 and the second even field E2, and the search range may include all fields or only a specific position corresponding to a target block in the fields. The first motion vector set MV1 is calculated by applying an SAD algorithm. After having determined the first motion vector set MV1, the motion interpolation circuit 23 performs motion interpolation on the field E1 and the field O2 according to the first motion vector set MV1, so as to generate four motion interpolation frames, i.e., a first motion interpolation frame I1, a second motion interpolation frame I2, a third motion interpolation frame I3 and a fourth motion interpolation frame I4. More particularly, without changing the direction of the MV1, the first interpolation frame I1 is generated by performing interpolation using one fifth of MV1, four fifth of the field E1 and one fifth of the field O2. Any pixel of the first interpolation frame I1 is calculated as:

$$pI1(x,y)=\tfrac{4}{5}*pE1(x1,y1)+\tfrac{1}{5}*pO2(x2,y2),$$

where pE1 and pO2 are obtained by mapping to the MV1.

Without changing the direction of the MV1, the second interpolation frame I2 is generated by performing interpolation process using two fifth of MV1, three fifth of the field E1 and two fifth of the field O2. Without changing the direction of the MV1, the third interpolation frame I3 is generated by performing interpolation process using three fifth of MV1, two fifth of the field E1 and three fifth of the field O2. Without changing the direction of the MV1, the fourth interpolation frame I4 is generated by performing interpolation using four fifth of MV1, one fifth of the field E1 and four fifth of the field O2. Subsequent frames P2, I5, I6, I7, I8 and P3 are similarly generated as the foregoing description. The frame processing circuit 24 outputs the frames P1, I1, I2, I3, I4, P2, I5, I6, I7, I8 and P3 in sequence with a frequency of 120 frames per second. The first even field E1 and the second odd field O2 used by the motion interpolation circuit 23 can be respectively replaced by the first odd field O1 and the second odd field O2, the first even field E1 and the second even field E2, the first frame P1 and the first frame P2, or the first odd field O1 and the second even field E2, so as to generate the first motion vector set MV1 and the interpolation frames I1, I2, I3, and I4.

Figure 3D:
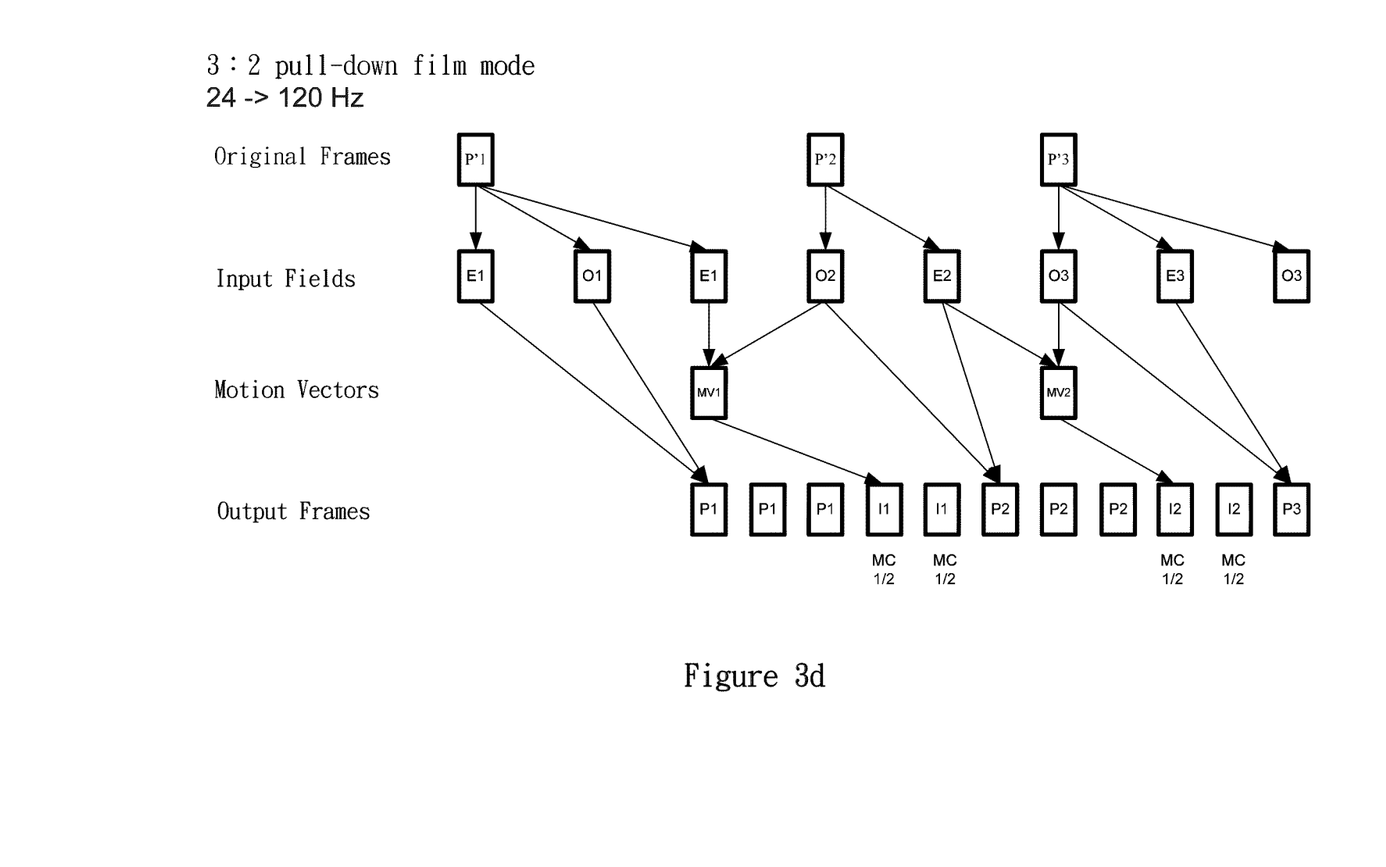
FIG. 3d is a schematic diagram of an image processing of another 3:2 pull-down film mode.

Refer to FIG. 3d showing a schematic diagram of another image processing of a 3:2 pull-down film mode in accordance with an embodiment of the present invention. The de-interlace circuit 22 of a TV receiving end restores a first restored frame P1 from either one of the fields E1 and the field O1 generated according to the first original frame P'1, and a second restored frame P2 from the field O2 and the field E2. The motion interpolation circuit 23 generates a first motion vector set MV1 according to the field E1 generated according to the first original frame P'1, and the field O2 generated according to the second original frame P'2. The foregoing processing is the same as the process illustrated in FIG. 3c. However, a difference between the processing in FIGS. 3c and 3d is that, in FIG. 3d, the motion interpolation circuit 23 only generates an interpolation frame I1 to perform motion interpolation on the field E1 and the field O2 according to the first motion vector set MV1. The interpolation frame I1 is generated as:

$$pI1(x,y)=\tfrac{1}{2}*pE1(x1,y1)+\tfrac{1}{2}*(x2,y2),$$

where pE1 and pO2 are obtained by mapping to the MV1.

When outputting frames, the frame processing circuit 24 selects between repeating to output a restored frame (e.g., the first restored frame P1) generated by the de-interlace circuit 22 and an interpolation frame (e.g., the first interpolation frame I1) generated by the motion interpolation circuit 23; that is, the frames P1, P1, P1, I1, I1, P2, P2, P2, I2, I2, and so on are outputted in sequence with a frequency of 120 frames per second. Similarly, the first even field E1 and the second odd field O2 used by the foregoing motion interpolation circuit 23 can be respectively replaced by the first odd field O1 and the second odd field O2, the first even field E1 and the second even field E2, the first frame P1 and the second frame P2, or the first odd field O1 and the second even field E2, so as to generated the first motion vector set MV1 and the interpolation frames I1, I2, I3, and I4.

In addition, FIG. 3c and FIG. 3d shows two frame interpolation situations in a 3:2 pull-down film mode; however, the present invention is not limited to the two situations. More particularly, in the 3:2 pull-down film mode, a period is from the first frame P1 to the second frame P2, and five frames are outputted during one period. The five frames comprise restored frames and interpolation frames associated with motion vectors. In principle, the interpolation frames are proportional to output times; however, the proportion is not the only limiting condition. According to quality of the interpolation frames, the image processing circuit determines five frames to be outputted during the period, the number of interpolation frames and a ratio between the interpolation frames and the motion vectors. For example, a quality parameter of the interpolation frames is associated with the SAD of the motion vectors. That is, the quality of the interpolation frames becomes unqualified as the SAD of the motion vectors gets too large, which means a display effect also worsens if the interpolation frames are utilized. At this point, the image processing circuit selects and outputs more restored frames and fewer interpolation frames or only outputs restored frames to gain a better display effect. For example, in the embodiment illustrated in FIG. 3d, the frames P1, P1, P1, I1 and I1 are outputted. Interpolation approaches as illustrated in FIG. 3c and FIG. 3d can be alternately used. That is, according to the quality of interpolation frames, the image processing circuit according to the present can select frames to be outputted from the restored frames and interpolation frames.

Figure 4:
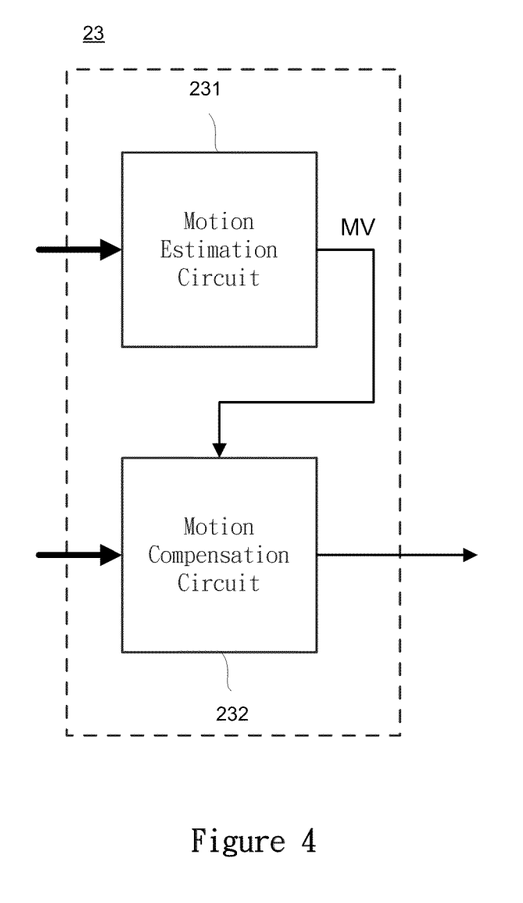
FIG. 4 is a block diagram of a motion interpolation circuit illustrated in FIG. 2 in accordance with an embodiment of the present invention.

Refer to FIG. 4 showing a block diagram of a motion interpolation circuit 23 illustrated in FIG. 2 in accordance with an embodiment of the present invention. The motion interpolation circuit 23 comprises a motion estimating circuit 231 and a motion compensation circuit 232. The motion estimating circuit 231 calculates a plurality of motion vectors according to a first field and a second field stored in the memory 21. The first field and the second field are respectively from two successive film frames, and the plurality of motion vectors correspond to a plurality of blocks corresponding to the fields. The motion compensation circuit 232 performs motion interpolation according to the first field and the second field stored in the memory 21 and the plurality of motion vectors MV generated by the motion estimating circuit 231, so as to generate a plurality of interpolation frames. Taking FIG. 3a for example, the motion estimating circuit 231 generates a first motion vector set MV1 according to a first odd field O1 and a second even field E2. The first motion vector set MV1 comprises at least one block motion vector respectively corresponding to various blocks of the first odd field O1 and the second even field E2. The motion compensation circuit 232 performs motion interpolation on the first odd field O1 and the second even field E2 (or a first restored frame P1 and a second restored frame P2) according to the first motion vector set MV1, so as to generate three motion interpolation frames, i.e., a first motion interpolation frame I1, a second motion interpolation frame I2 and a third motion interpolation frame I3. Referring to FIG. 3a and FIG. 3b, the foregoing motion estimation and motion interpolation algorithms are disclosed correspondingly. Refer to R.O.C. patent application No. 97100389 to obtain a detailed description of a motion interpolation circuit.

Figure 5A:
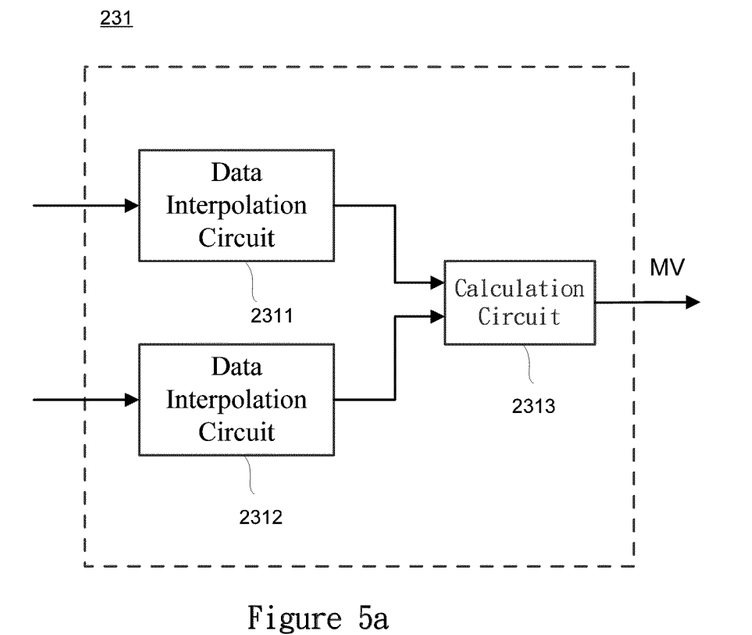
FIG. 5a is a block diagram of a motion estimating circuit illustrated in FIG. 4 in accordance with an embodiment of the present invention.

Refer to FIG. 5a showing a motion estimating circuit 231 illustrated in FIG. 4 in accordance with an embodiment of the present invention. The motion estimating circuit 231 comprises two data interpolation circuits 2311 and 2312, and a calculation circuit 2313. The two data interpolation circuits 2311 and 2312 respectively restore the first frame and the second frame from successive fields of a first frame and a second frame. The calculation circuit 2313 calculates motion vectors according to the first frame and the second frame. Taking FIG. 3a for example, the data interpolation circuits 2311 and 2312 respectively restore a first restored frame P1 and a second restored frame P2 from a first odd field O1 and a second even field E2. The calculation circuit 2313 generates a first motion vector set MV1 according to the first restored frame P1 and the second restored frame P2.

Figure 5B:
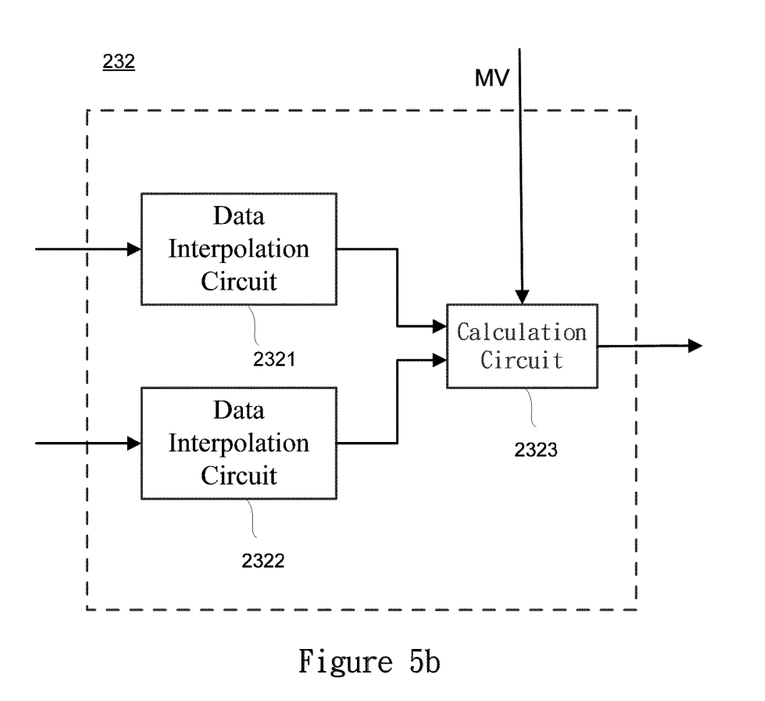
FIG. 5b is a block diagram of a motion compensation circuit illustrated in FIG. 4 in accordance with an embodiment of the present invention.

Refer to FIG. 5b showing a block diagram of a motion compensation circuit 232 illustrated in FIG. 4 in accordance with an embodiment of the present invention. The motion compensation circuit 232 comprises two data interpolation circuits 2321 and 2322, and a calculation circuit 2323. The interpolation circuits 2321 and 2322 respectively restore the first frame and the second frame from successive fields of a first frame and a second frame. The calculation circuit 2323 performs motion interpolation according to the first frame and the second frame and motion vectors generated by the motion estimating circuit 231, so as to generate a plurality of interpolation frames. Taking FIG. 3a for example, the data interpolation circuits 2321 and 2322 respectively restore a first restored frame P1 and a second restored frame P2 from a first odd field O1 and a second even field E2. The calculation circuit 2313 performs motion interpolation on the first odd field O1 and the second even field E2 (or the first restored frame P1 and the second restored frame P2) according to a first motion vector set MV1, so as to generate three motion interpolation frames, i.e., a first motion interpolation frame I1, a second motion interpolation frame I2 and a third motion interpolation frame I3.

Figure 6:
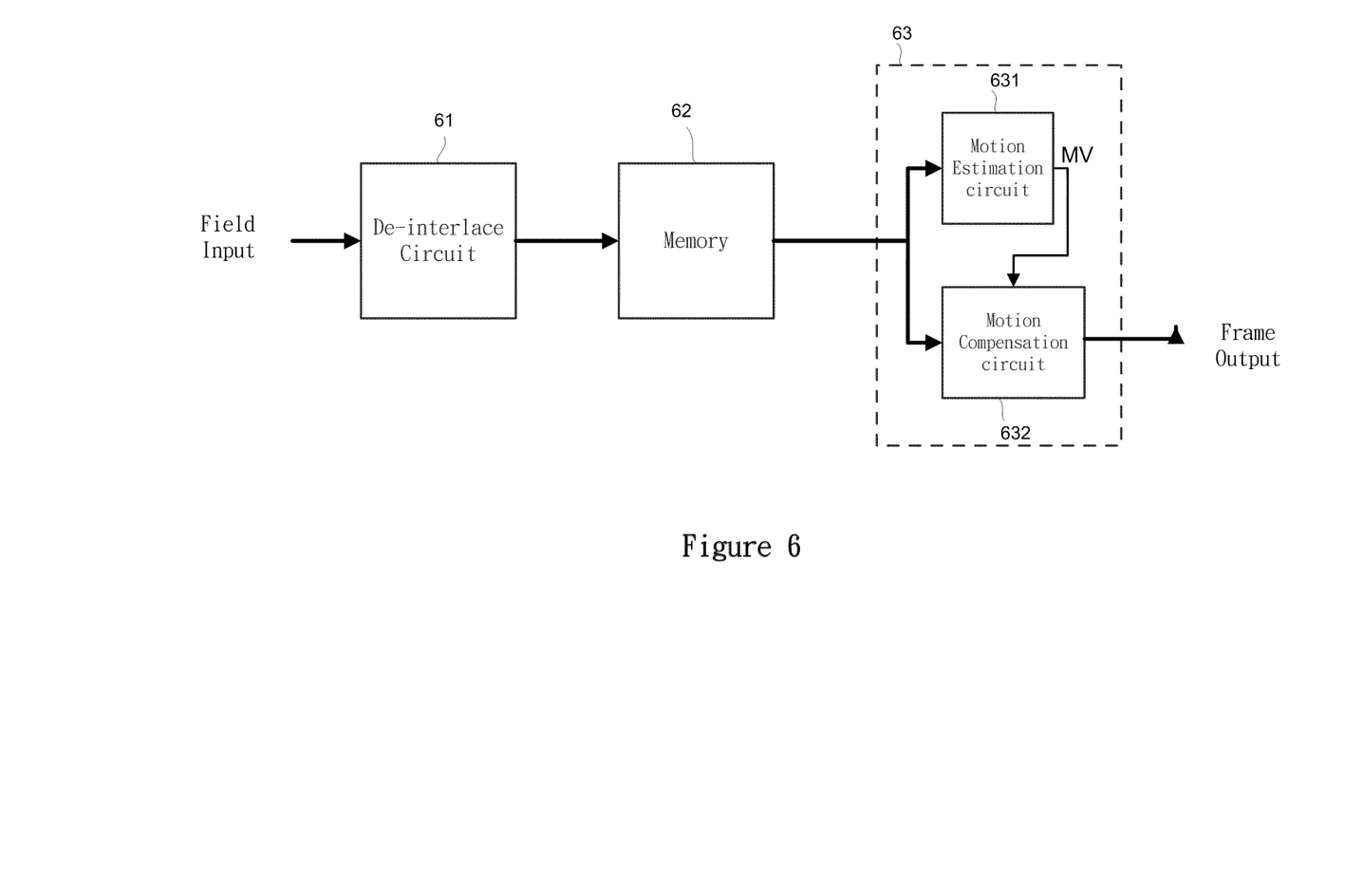
FIG. 6 is a block diagram of an image processing circuit in accordance with another embodiment of the present invention.

Refer to FIG. 6 showing a block diagram of an image processing circuit in accordance with another embodiment of the present invention. The image processing circuit comprises a de-interlace circuit 61, a memory 62 and a motion interpolation circuit 63. The de-interlace circuit 61 restores frames, from fields in a film mode, to be stored into the memory 62. Taking a 2:2 pull-down film mode for example, the de-interlace circuit 61 receives and restores 25 frames per second from 50 fields per second. Taking a 3:2 pull-down film mode for example, the de-interlace circuit 61 receives and restores 24 frames per second from 60 fields per second. The memory 62 may be a frame buffer integrated to the image processing circuit. On the contrary, when the memory 62 is not contained in the foregoing image processing circuit, a DRAM coupled to the image processing circuit is used for storing the frames. That is, the image processing circuit 63 and the memory 62 may be in different chips. The motion interpolation circuit 63 coupled to the memory 62 is used for calculating and generating at least one interpolation frame according to the frames stored in the memory 62. The motion interpolation circuit 63 comprises a motion estimating circuit 631 and a motion compensation circuit 632. The motion estimating circuit 631 calculates a plurality of block motion vectors according to the first frame and the second frame. The plurality of block motion vectors respectively correspond to the first frame and the second frame. The motion compensation circuit 632 performs motion interpolation according to the first frame and the second frame stored in the memory 62 and the plurality of block motion vectors generated by the motion estimating circuit 631, so as to generate a plurality of interpolation frames. Taking a 2:2 pull-down film mode for example, the motion calculating circuit 631 generates a first motion vector by comparing differences between blocks of the first frame and the second frame. The first motion vector comprises at least one block motion vector respectively corresponding to various blocks of the first frame and the second frame. The motion compensation circuit 632 performs motion interpolation on the first frame and the second frame according to the first motion vector and a time ratio, so as to generate a first motion interpolation frame, a second motion interpolation frame, and a third motion interpolation frame, and output the first frame, the first motion interpolation frame, a second motion interpolation frame, a third motion interpolation frame and the second frame in sequence.

An image processing method for processing a plurality of successive fields in a film mode is provided according to the present invention. The plurality of successive fields comprises a first field and a second field respectively from successive two film frames. The method comprises calculating a plurality of block motion vectors according to the first field and the second field, generating at least one interpolation frame according to the first field, the second field and the plurality of motion vectors, and generating a restored frame by integrating the first field and a previous field before the first field. The first field and the previous field are from a same film frame. The step of generating the at least one interpolation frame comprises generating a quality parameter and determining the number and a generation time of the generated interpolation frame according to the quality parameter. In 3:2 pull-down film mode of outputting 120 frames per second, four interpolation frames are generated by integrating the first field and the second field according to proportions of one fifth, two fifth, three fifth and four fifth of the plurality of motion vectors. In 2:2 pull-down film mode of outputting 100 frames per second, three interpolation frames are generated by integrating the first field and the second field according to proportions of one quarter, two quarters and three quarters of the plurality of motion vectors. A sequence of outputting the restored frames and the interpolation frames is determined according to the quality parameter.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing method, for processing a plurality of successive fields, comprising:
   receiving a first field from a first film frame and a second field from a second film frame wherein said first film frame and said second film frame are successive;
   calculating a motion vector set according to the first field and the second field; and
   generating at least one interpolation frame according to the first field, the second field, and the motion vector set, comprising the steps of:

generating a quality parameter associated with the motion vector set; and determining the amount of the at least one interpolation frames to be generated and the output timing of each of the at least one interpolation frames according to the quality parameter;

wherein the step of generating the at least one interpolation frame further comprises generating a first interpolation frame, a second interpolation frame, a third interpolation frame, and a fourth interpolation frame under 3:2 pull-down film mode for outputting 120 frames per second, and the four interpolation frames are obtained by integrating the first field and the second field according to proportions of one fifth, two fifth, three fifth and four fifth of the motion vector set.

2. The image processing method as claimed in claim 1, wherein said first film frame comprises a first odd field and a first even field, said first field is one of said first odd field and said first even field from said first film frame, and said image processing method further comprises generating a first restored frame by integrating said first odd field and said first even field.

3. The image processing method as claimed in claim 2, further comprising:

determining a sequence for outputting the first restored frame and the interpolation frames according to the quality parameter.

4. The image processing method as claimed in claim 1, wherein the motion vector set is obtained by performing block matching on the first field and the second field.

5. The image processing method as claimed in claim 1, wherein the interpolation frames are obtained by integrating the first field and the second field according to a linear ratio of the motion vector set.

6. An image processing method, for processing a plurality of successive fields, comprising:

receiving a first field from a first film frame and a second field from a second film frame wherein said first film frame and said second film frame are successive;

calculating a motion vector set according to the first field and the second field; and generating at least one interpolation frame according to the first field, the second field, and the motion vector set, comprising the steps of:

generating a quality parameter associated with the motion vector set; and determining the amount of the at least one interpolation frames to be generated and the output timing of each of the at least one interpolation frames according to the quality parameter;

wherein the step of generating the at least one interpolation frame further comprises generating a first interpolation frame, a second interpolation frame and a third interpolation frame under 2:2 pull-down film mode for outputting 100 frames per second, and the three interpolation frames are obtained by integrating the first field and the second field according to proportions of a quarter, two quarters and three quarters of the motion vector set.

7. The image processing method as claimed in claim 6, wherein said first film frame comprises a first odd field and a first even field, said first field is one of said first odd field and said first even field from said first film frame, and said image processing method further comprises generating a first restored frame by integrating said first odd field and said first even field.

8. The image processing method as claimed in claim 7, further comprising:

determining a sequence for outputting the first restored frame and the interpolation frames according to the quality parameter.

9. The image processing method as claimed in claim 6, wherein the motion vector set is obtained by performing block matching on the first field and the second field.

10. An image processing circuit, for processing a plurality of successive fields comprising a first field from a first film frame and a second field from a second film frame, wherein the first film frame and the second film frame are successive, the image processing circuit comprising:

a motion estimating circuit, for performing block matching on the first field and the second field to generate a motion vector set; and a motion compensation circuit, for performing motion interpolation to generate at least one interpolation frame according to the first field, the second field, and the motion vector set, comprising the steps of:

generating a quality parameter associated with the motion vector set; and determining the amount of the at least one interpolation frames to be generated and the output timing of each of the at least one interpolation frames according to the quality parameter;

wherein the motion compensation circuit generates a first interpolation frame, a second interpolation frame, a third interpolation frame, and a fourth interpolation frame under 3:2 pull-down film mode for outputting 120 frames per second, and the interpolation frames are obtained by integrating the first field and the second filed according to proportions of one fifth, two fifth, three fifth and four fifth of the motion vector set.

11. The image processing method as claimed in claim 6, wherein the interpolation frames are obtained by integrating the first field and the second field according to a linear ratio of the motion vector set.

12. An image processing circuit, for processing a plurality of successive fields comprising a first field from a first film frame and a second field from a second film frame, wherein the first film frame and the second film frame are successive, the image processing circuit comprising:

a motion estimating circuit, for performing block matching on the first field and the second field to generate a motion vector set; and a motion compensation circuit, for performing motion interpolation to generate at least one interpolation frame according to the first field, the second field, and the motion vector set, comprising the steps of:

generating a quality parameter associated with the motion vector set; and determining the amount of the at least one interpolation frames to be generated and the output timing of each of the at least one interpolation frames according to the quality parameter;

wherein the motion compensation circuit generates a first interpolation frame, a second interpolation frame and a third interpolation frame under 2:2 pull-down film mode for outputting 100 frames per second, and the interpolation frames are obtained by integrating the first field and the second filed according to proportions of a quarter, two quarters and three quarters of the motion vector set.

13. The image processing circuit as claimed in claim 10, wherein said first film frame comprises a first odd field and a first even field, said first field is one of said first odd field and said first even field, and said image processing circuit further comprising:

a de-interlace circuit, for generating a first restored frame according to said first odd field and said first even field; and a frame processing circuit, for determining a sequence of outputting the first restored frame and the interpolation frames according to the quality parameter.

14. The image processing circuit as claimed in claim 12, wherein said first film frame comprises a first odd field and a first even field, said first field is one of said first odd field and said first even field, and said image processing circuit further comprising:

a de-interlace circuit, for generating a first restored frame according to said first odd field and said first even field; and a frame processing circuit, for determining a sequence of outputting the first restored frame and the interpolation frames according to the quality parameter.

* * * * *